(12) United States Patent
Pask et al.

(10) Patent No.: US 6,901,084 B2
(45) Date of Patent: May 31, 2005

(54) STABLE SOLID STATE RAMAN LASER AND A METHOD OF OPERATING SAME

(75) Inventors: Helen M. Pask, Seaforth (AU); James A. Piper, Huntley's Cove (AU)

(73) Assignee: Macquarie Research Ltd., NSW (AU)

(*) Notice: Subject to any disclaimer, the term of this patent is extended or adjusted under 35 U.S.C. 154(b) by 0 days.

(21) Appl. No.: 10/333,672

(22) PCT Filed: Jul. 26, 2001

(86) PCT No.: PCT/AU01/00906

§ 371 (c)(1),
(2), (4) Date: Sep. 2, 2003

(87) PCT Pub. No.: WO02/09246

PCT Pub. Date: Jan. 31, 2002

(65) Prior Publication Data

US 2004/0028090 A1 Feb. 12, 2004

(30) Foreign Application Priority Data

Jul. 26, 2000 (AU) .............................................. PQ9014

(51) Int. Cl.[7] .............................. H01S 3/30; H01S 3/10
(52) U.S. Cl. ............................................. 372/3; 372/21
(58) Field of Search ................................. 372/3, 21–28

(56) References Cited

U.S. PATENT DOCUMENTS

| | | | |
|---|---|---|---|
| 4,048,516 A | 9/1977 | Ammann | 307/88.3 |
| 4,165,469 A | 8/1979 | Ammann | 307/426 |
| 5,046,070 A | 9/1991 | Negus | 372/33 |
| 5,182,759 A | 1/1993 | Anthon et al. | 372/72 |
| 5,285,467 A | 2/1994 | Scheps | 372/69 |
| 5,307,358 A | 4/1994 | Scheps | 372/20 |
| 5,412,683 A | 5/1995 | Nighan, Jr. et al. | 372/75 |
| 5,651,020 A | 7/1997 | Nighan, Jr. et al. | 372/92 |
| 5,673,281 A * | 9/1997 | Byer | 372/3 |
| 5,796,761 A * | 8/1998 | Injeyan et al. | 372/3 |
| 5,905,749 A | 5/1999 | Iwashiro et al. | 372/33 |
| 5,907,950 A | 6/1999 | Enderle et al. | 60/286 |
| 6,090,102 A * | 7/2000 | Telfair et al. | 606/10 |
| 6,115,402 A | 9/2000 | Caprara | 372/101 |
| 6,393,034 B1 * | 5/2002 | Konno et al. | 372/10 |
| 6,466,806 B1 * | 10/2002 | Geva et al. | 600/310 |

FOREIGN PATENT DOCUMENTS

JP    10-150238    6/1998

OTHER PUBLICATIONS

"Solid–State Raman Lasers", Murray et al., Cleo'96: Summaries of Papers Presented at Conference on Lasers and Electro–optics, vol. 9, Technical Digest Series, 1996, pp. 316–317.

(Continued)

Primary Examiner—Minsun Oh Harvey
Assistant Examiner—Phillip Nguyen
(74) Attorney, Agent, or Firm—Heller Ehrman White & McAuliffe; Paul Davis

(57) ABSTRACT

The present invention relates to a stable solid-state Raman laser, the solid-state Raman laser including a resonator cavity defined by at least two reflectors, a laser material located in the resonator cavity and capable of generating a cavity laser beam which propagates within the resonator cavity, a solid Raman medium located in the resonator cavity for shifting the frequency of the cavity laser beam to produce a Raman laser beam which propagates within the resonator cavity; and an output coupler for coupling and outputting the Raman laser beam from the resonator cavity, wherein at least one parameter selected from the group consisting of the position of the laser material relative to the position of the Raman medium in the cavity, the length of the cavity and the curvature of at least one of the reflectors, is selected such that changes in the focal lengths of both the laser material and the Raman medium as a result of thermal effects in the laser material and the Raman medium during operation of the laser do not substantially cause instability in the power of the output Raman laser beam. A method of maintaining stable operation of a solid state Raman laser is also described.

17 Claims, 9 Drawing Sheets

OTHER PUBLICATIONS

"0.9–W Raman Oscillator", Ammann et al., Journal of Applied Physics, vol. 48, No. 5, May 1977, pp. 1973–1975.

"Thermal Lensing Measurements in Line–Focus End–Pumped Neodymium Yttrium Aluminium Garnet Using Holographic Lateral Shearing Interferometry", Blows et al., Journal of Applied Physics, vol. 83, No. 6, Mar. 15, 1998, pp. 2901–2906.

"A Simple, Thermally–Stabilised, Diode End–Pumped, Planar Nd:YAG Laser", Blows et al., Optics Communications 162, Apr. 15, 1999, pp. 247–250.

"Efficient All–Solid–State Yellow Laser Source Producing 1.2–W Average Power", Pask et al., Optics Letters, vol. 24, No. 21, Nov. 1, 1999, pp. 1490–1492.

"Thermal Lensing Measurements in an Intracavity LiIO3 Raman Laser", Revermann et al., OSA TOPS vol. 34, Advanced Solid State Lasers, 2000, pp. 506–509.

"Diode–Pumped $LiIO_3$ Intracavity Raman Lasers", Pask et al., IEEE Journal of Quantum Electronics, vol. 36, No. 8, Aug. 2000, pp. 949–955.

"Thermal Lensing In A Barium Nitrate Raman Laser", Pask et al., OSA Tops vol. 50, Advanced Solid–State Lasers, 2001, pp. 441–444.

International Search Report in PCT/AU01/00906 dated Sep. 28, 2001.

International Preliminary Examination Report in PCT/AU01/00906 dated Jan. 24, 2002.

E.O. Ammann: "High–average–power Raman oscillator employing a shared–resonator configuration", Applied Physics letters 32(1), Jan., 1978.

Extracts from Hodges and Weber: "Optical Resonators" Springer–Verlag London Limited, 1997.

Optical Society of America, "Handbook of Optics" M. Bass, vol. II, p. 123, 1995.

Blows, Dawes and Omatsu: "Thermal lensing measurements in line–focus end–pumped neodymium yttrium aluminium garnet using holographic lateral shearing interfermetry", Journal of Applied Physics, vol. 83, No. 6, Mar. 15, 1998.

* cited by examiner

STABLE SOLID STATE RAMAN LASER AND A METHOD OF OPERATING SAME

This is the U.S. national phase of International Application No. PCT/AU01/00906 filed Jul. 26, 2001, the entire disclosure of which is incorporated herein by reference.

TECHNICAL FIELD

The present invention relates to a stable solid-state Raman laser and a method of maintaining stable operation of a solid-state Raman laser.

BACKGROUND OF THE INVENTION

Solid-state Raman lasers are a practical and efficient approach to optical frequency down conversion offering high (up to 70–80%) conversion efficiencies with respect to the pump laser power, excellent beam quality and ease of alignment In recent years use of crystals for stimulated Raman scattering (SRS) has been gaining interest because, in comparison with high-pressure gaseous and dye (liquid) Raman lasers, crystalline Raman lasers offer better gain, better thermal and mechanical properties, better reliability and the ability to operate at high pulse-repetition frequency. Further they are compatible with compact all-solid state laser technology.

The potential of crystalline Raman lasers for efficient frequency conversion was first reported by E. O. Ammann and C. D. Dekker, "0.9 W Raman oscillator", *J. Appl. Phys.*, vol. 48, no. 5, pp 1973–1975, 1977 who obtained 0.9 W at the first Stokes wavelength employing SRS in crystalline lithium iodate ($LiIO_3$) inside the resonator of a Nd:YALO laser with optical to optical conversions of up to 77%. Other suitable crystals include various tungstates, molybdate, and barium nitrate. By selecting the nature of the crystal used it is possible for frequency conversion to particular discrete wavelengths.

The output beam at the Raman wavelength (or its second harmonic) typically has very good beam quality and spatial characteristics and pointing stability and can be efficiently (80–90%) coupled into optical fibres (typically 50–600 µm diameter) as required for many applications.

Solid-state Raman laser systems suffer from the problem however that they are complex in design and operation and it is generally difficult to design a solid-state Raman laser which is capable of being operated with stability from initial current input to the optical power pump source up to maximum current and over a long period of time. If the laser system is not effectively stable, alignment and power drifts result. It would be desirable to find a simple method to design solid-state lasers for a particular operating point within various power regimes including low power regimes (about 10 mW output power) and higher power regimes (greater than 1 W) which are able to be operated with stability. It would also be desirable to design a solid-state Raman laser system which is efficient, has low sensitivity to misalignment, good beam quality and can generate output of up to several Watts of Stokes output or when applicable, its second harmonic.

OBJECT OF THE INVENTION

It is the object of the present invention to overcome or substantially ameliorate at least one of the above disadvantages or at least provide a suitable alternative.

SUMMARY OF THE INVENTION

According to a first aspect, the present invention consists in a stable solid-state Raman laser, the solid-state Raman laser including:

(a) a resonator cavity defined by at least two reflectors, (b) a laser material located in the resonator cavity and capable of generating a cavity laser beam which propagates within the resonator cavity, (c) a solid Raman medium located in the resonator cavity for shifting the frequency of the cavity laser beam to produce a Raman laser beam which propagates within the resonator cavity; and (d) an output coupler for coupling and outputting the Raman laser beam from the resonator cavity, wherein at least one parameter selected from the group consisting of (i) the position of the laser material relative to the position of the Raman medium in the cavity, (ii) the length of the cavity and (iii) the curvature of at least one of the reflectors, is selected such that changes in the focal lengths of both the laser material and the Raman medium as a result of thermal effects in the laser material and the Raman medium during operation of the laser do not substantially cause instability in the power of the output Raman laser beam.

Suitably the at least one parameter is selected to provide the output Raman laser beam with optimum power output.

Suitably the laser further includes a non-linear medium for frequency doubling the Raman laser beam, the non-linear medium being located at a position selected from the group consisting of internal to the resonator cavity and external to the resonator cavity.

Suitably in addition, at least one additional parameter selected from the group consisting of (iv) the separation between the reflectors, the laser material and the Raman medium and if preset, a non-linear medium; (v) the transmission characteristics of the output coupler; and (vi) the pulse repetition frequency of the output; are selected such that changes in the focal lengths of both the laser material and the Raman medium as a result of thermal effects in the laser material and the Raman medium during operation of the laser do not substantially cause instability in the power of the output Raman laser beam. Suitably the at least one additional parameter is selected to provide the output Raman laser beam with optimum power output.

Suitably the beam waist and resonator mode sizes in the laser material and the Raman medium and a non-linear medium, if present, are such that, in use, the laser provides an output Raman laser beam in an output power range whilst avoiding optical damage of the laser material and the Raman medium. Suitably the output power range corresponds to a single output power. Suitably the output power range is a range selected from the group consisting of the optimal output power, a near optimal output power and a below optimal output power.

Suitably the at least one parameter is selected whereby in use the beam waist and resonator mode sizes in the laser material and the Raman medium and in a non-linear medium, if present, are optimised for an output power range of the output Raman laser beam whilst maintaining the cavity stability and avoiding optical damage to the laser material and the Raman medium.

Suitably the laser material, the Raman medium and if present, a non-linear medium are present as non-discrete elements, one component performing the dual function selected from the group consisting of (i) both the laser material and non-linear medium; (ii) both the laser material and the Raman medium; and (iii) both the Raman medium and the non-linear medium.

Suitably the laser material is selected from the group consisting of Nd:YAG, Nd:YVO$_4$ and Nd:YLF; and the Raman medium is selected from the group consisting of $LiIO_3$, $CaWO_4$, KGW and $Ba(NO_3)_2$. Suitably the non-linear medium is selected from the group consisting of LBO, BBO and KTP.

Suitably the laser further includes a pumping laser source for pumping the laser material and Raman medium so as to produce a fundamental laser beam and Raman laser beam which propagate within the cavity. Suitably the laser includes means to vary the frequency of the pumping laser source so as to vary the output power of the output Raman laser beam.

According to a second aspect, the present invention consists in a method of maintaining stable operation of a solid state Raman laser, the solid state Raman laser including (a) a resonator cavity defined by at least two reflectors, (b) a laser material located in the resonator cavity and capable of generating a cavity laser beam which propagates within the resonator cavity, (c) a solid Raman medium located in the resonator cavity for shifting the frequency of the cavity laser beam to produce a Raman laser beam which propagates within the resonator cavity; and (d) an output coupler for coupling and outputting the Raman laser beam from the resonator cavity, the method including (a) at least one step selected from the group consisting of (i) positioning the laser material relative to the Raman medium in the cavity, (ii) altering the length of the cavity and (iii) selecting a curvature of at least one of the reflectors, such that changes in the focal lengths of both the laser material and the Raman medium as a result of thermal effects in the laser material and the Raman medium during operating of the laser do not substantially cause instability in the power of the output Raman laser beam; and (b) pumping the laser material and the Raman medium with a pumping beam to provide an output Raman laser beam with stable power output.

Suitably the method includes determining the focal lengths of the laser material and the Raman medium.

Suitably in the method step (a) comprises selecting the parameter so as to provide the output Raman laser beam with optimum output power.

Suitably in the method the laser further includes a non-linear medium for frequency doubling the Raman laser beam to produce an output at its second harmonic or other sub-frequency or different frequency wavelength, the non-linear medium being present in the resonator cavity or external to resonator cavity, the method including frequency doubling the Raman laser beam to produce said output. Suitably the frequency doubling produces an output at a wavelength selected from the group consisting of about 532 nm, 578–580 nm, 632–636 nm, about 598 nm and combinations thereof.

Suitably in the method step (a) includes optimising the beam waist and resonator mode sizes of the laser material and the Raman medium and a non-linear medium, if present, for a desired output power range whilst maintaining cavity stability and avoiding optical damage of the resonator components.

According to a third aspect, the present invention consists in a stable solid-state Raman laser, the solid-state Raman laser including:

(a) a resonator cavity defined by at least two reflectors, (b) a laser material located in the resonator cavity and capable of generating a cavity laser beam which propagates within the resonator cavity, (c) a solid Raman medium located in the resonator cavity for shifting the frequency of the cavity laser beam to produce a Raman laser beam which propagates within the resonator cavity; and (d) an output coupler for coupling and outputting the Raman laser beam from the resonator cavity, wherein the beam waist and resonator mode sizes in the laser material and the Raman medium in the cavity are selected such that in use changes in the focal lengths of both the laser material and the Raman medium as a result of thermal effects in the laser material and the Raman medium during operation of the laser do not substantially cause instability in the power of the output Raman laser beam.

According to a fourth aspect, the present invention consists in a method of maintaining stable operation of a solid state Raman laser, the solid state Raman laser including (a) a resonator cavity defined by at least two reflectors, (b) a laser material located in the resonator cavity and capable of generating a cavity laser beam which propagates within the resonator cavity, (c) a solid Raman medium located in the resonator cavity for shifting the frequency of the cavity laser beam to produce a Raman laser beam which propagates within the resonator cavity; and (d) an output coupler for coupling and outputting the Raman laser beam from the resonator cavity, wherein the beam waist and resonator mode sizes in the laser material and the Raman medium in the cavity are selected such that in use changes in the focal lengths of both the laser material and the Raman medium as a result of thermal effects in the laser material and the Raman medium during operation of the laser do not substantially cause instability in the power of the output Raman laser beam, the method including the step of pumping the laser material and the solid Raman medium with a pumping beam to provide an output Raman laser beam with stable output power.

Suitably in the method the laser further further includes a non-linear medium positioned in the cavity or external to the cavity for frequency doubling the Raman laser beam to produce an output, the method including operating the laser to produce said frequency-shifted output wherein the beam waist and resonator modes size in the non-linear medium is selected such that in use changes in the focal lengths of both the laser material and the Raman medium as a result of thermal effects in he laser material and the Raman medium during operation of the laser do not substantially cause instability in the power of the output Raman laser beam.

According to a fifth aspect, the present invention consists in a stable solid-state Raman laser, the solid-state Raman laser including:

(a) a resonator cavity defined by at least two reflectors, (b) a laser material located in he resonator cavity and capable of generating a cavity laser beam which propagates within the resonator cavity, (c) a solid Raman medium located in the resonator cavity for shifting the frequency of the cavity laser beam to produce a Raman laser beam which propagates within the resonator cavity; and (d) an output coupler for coupling and outputting the Raman laser beam from the resonator cavity, wherein a beam waist and resonator mode sizes of the laser material and the Raman medium are such that the Raman laser operates in a desired output power range whilst maintaining cavity stability and avoiding optical damage of the resonator components.

Suitably the Raman laser further includes a non-linear medium positioned in the cavity or external to the cavity for frequency doubling the Raman laser beam to produce an output at its second harmonic or other subfrequency or different frequency wavelength, the beam waist and resonator mode size of the non-linear medium being such that the Raman laser operates in the desired output power range whilst maintaining cavity stability and avoiding optical damage of the resonator components. Suitably the beam waist and resonator mode size of the non-linear medium is optimised for optimum power output. Suitably the position of the non-linear medium is selected such that during operation of the laser, the beam waist and resonator mode sizes of the laser material, Raman medium and non-linear medium are such that the Raman laser operates in the desired output power range whilst maintaining cavity stability and avoiding optical damage of the resonator components.

Suitably at least one parameter selected from the group consisting of (i) a position of the laser material and a position of the Raman medium and optionally, if present a position of a non-linear medium in the cavity, (ii) a length of the cavity or (iii) a curvature of at least one of the reflectors is selected such that the Raman laser operates in the desired output power range whilst maintaining cavity stability and avoiding optical damage of the resonator components. Suitably the at least one parameter is selected to provide the output power beam with optimum power output.

Suitably in addition at least one additional parameter selected from the group consisting of (iv) the separation between one or more of the reflectors, the laser material and the Raman medium and optionally if present a non-linear medium; (v) the transmission characteristics of the output coupler; and (vi) the pulse repetition frequency of the output; are selected such that during operation of the laser, the beam waist and resonator mode sizes of the laser material, the Raman medium and if present the non-linear medium are such that the Raman laser operates in the desired output power range whilst maintaining cavity stability and avoiding optical damage of the resonator components. Suitably the at least one additional parameter is selected to provide the output beam with optimum power output.

According to a sixth aspect, the present invention consists in a method of maintaining stable operation of a solid state Raman laser, the solid state Raman laser including
 (a) a resonator cavity defined by at least two reflectors,
 (b) a laser material located in the resonator cavity and capable of generating a cavity laser beam which propagates within the resonator cavity,
 (c) a solid Raman medium located in the resonator cavity for shifting the frequency of the cavity laser beam to produce a Raman laser beam which propagates within the resonator cavity; and
 (d) an output coupler for coupling and outputting the Raman laser beam from the resonator cavity,
 the method including operating the laser such that a beam waist and resonator mode sizes of the laser material and the Raman medium are such that the Raman laser operates in a desired output power range whilst maintaining cavity stability and avoiding optical damage of the resonator components.

Suitably the method includes determining the beam waist and resonator mode sizes of the laser material and the Raman medium and if present a non-linear medium.

BRIEF DESCRIPTION OF THE DRAWINGS

A preferred form of the present invention will now be described by way of example with reference to the accompanying drawings wherein.

DETAILED DESCRIPTION OF THE PREFERRED EMBODIMENTS

Figure 1:
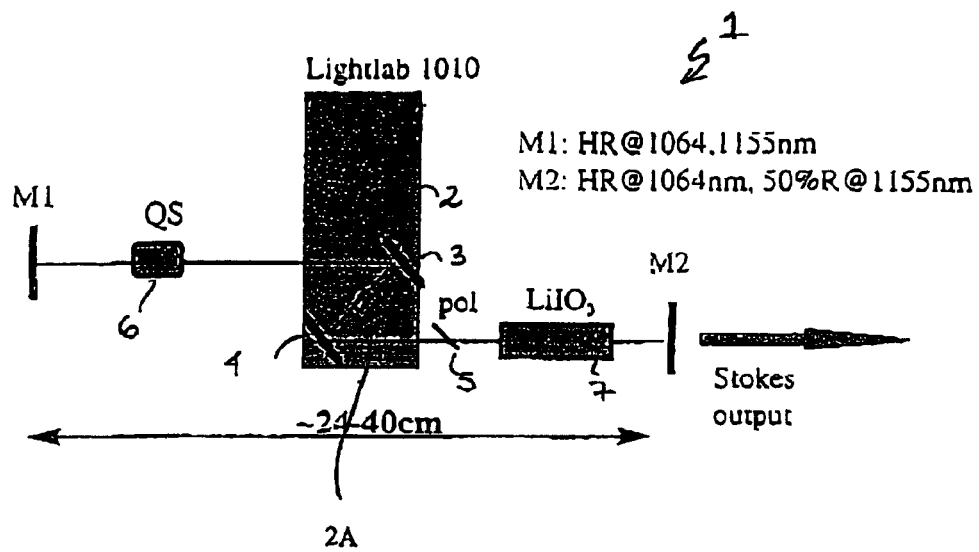
FIG. 1 is a schematic drawing of a suitable Raman laser configuration for use in the present invention.

The present inventors have discovered that the resonator stability problems associated with operation of Raman solid-state lasers can be solved by design a solid-state Raman laser taking into account the thermal leaning power of the laser material and the Raman medium.

Thermal lenses are formed in the laser material in the following way. In the process of generating laser output at the fundamental wavelength in the laser material, heat is deposited in the laser material and a temperature distribution is established. Through the thermo-optic coefficient, a variation in refractive index develops across the laser material, which acts to focus light passing through the material, the laser material acting as a converging lens—this is a thermal lensing effect having a focal length $f_L$. The magnitude of $f_L$ decreases with increasing absorbed pump power and for maximum absorbed pump power $f_L = f_{L(min)}$ i.e. from initial start-up current to maximum operating current, there is a decrease in focal lengths of the laser medium.

Thermal lenses are also generated in the Raman medium. With frequency conversion by SRS (stimulated Raman scattering) there is a generation of phonons in the Raman medium which decay rapidly such that there is a uniform generation of heat inside the Raman medium leading to significant lensing effects and a focal length $f_R$. These effects arise from the inelastic nature of the nonlinear, nonuniform process and for every scattering event, a small fraction of the photon energy (7.9% in the case of $LiIO_3$) is deposited as heat in the Raman medium. The degree of heating increases with the power generated at the Stokes wavelengths, more specifically for every first or second Stokes photon generated inside the laser cavity, a small but fixed amount of heat is deposited inside the medium. The resulting temperature distribution which is affected by the thermal conductivity of the crystal and the size of the laser beam inside the resonator cavity causes a variation of refractive index across the medium. While the positive thermal lens in for example a Nd:YAG laser medium scales approximately linearly with absorbed power from a laser diode, the thermal lens in for example $LiIO_3$ depends on the intracavity power density at the first-Stokes wavelength. For $LiIO_3$, the thermo-optic coefficient (dn/dT) is $-84.9 \times 10^{-6} K^{-1}$ at a wavelength of 1 micron (according to Optical Society of America Handbook of Optics, ed. Bass, 1995) (over ten U larger than in Nd:YAG and of opposite sign). This means that light passing through the Raman medium is caused to diverge as though passing through a conventional lens with focal length "$f_R$". Based on measurement of the thermal lens by the inventor in an arclamp-pumped $LiIO_3$ Raman laser, the size of the negative thermal lens in $LiIO_3$ may be as short as −10 cm (comparable to that in the Nd:YAG medium).

Both the thermal lenses in the laser material and in the Raman medium impact substantially on the stability characteristics of the resonator in a dynamic way. Suitably the position of the laser material and the Raman medium in the cavity and/or reflector (mirror) curvatures is such that the laser is capable of stable operation over a sufficiently-wide range of combinations for $F_L$ and $F_R$ including the special case where $f_L = f_R =$ infinite (so that laser action can be initiated) and also $f_R =$ infinite, $f_L > f_{L(min)}$ (so that laser action desirably does not cease if SRS ceases).

Suitably a curvature of at least one of the reflectors and/or the positions of the laser material and the Raman medium relative to the cavity configuration are such that the focal lengths of the laser material at pump input powers and the focal lengths of the Raman medium at the desired Raman laser output power range are maintained within a stable and preferably efficient operating region. In preferred embodiments this can be achieved by optimising the cavity configuration as a function of the focal lengths by in addition to positioning the laser material and Raman medium within the cavity and/or selecting a curvature of at least one of the reflectors, optimising one of more of:

a separation between one or more of the reflectors, the laser material and the Raman medium;

transmission characteristics of the output coupler; and the pulse repetition frequency.

Additional effects such as gain focusing and self-focussing of the Raman and/or laser beams may affect the resonator stability but these are considered to be of lesser importance than the effects already discussed.

In preferred embodiments the laser is also optimised for given pump powers for optimum mode sizes in the laser gain material and in the Raman gain medium and if present a non-linear medium and optimum laser output power so as to obtain efficient energy extraction from the laser material as well as efficient conversion through stimulated Raman scattering (SRS) in the Raman crystal and if present the non-linear medium whilst maintaining cavity stability and avoiding optical damage of the laser components i.e., the various components are matched on the basis of their associated mode sizes. The optimum spot size and power density in the Raman medium is typically a compromise between maximizing the conversion efficiency and avoiding optical damage. The cavity is suitably optimised so that the relative mode size in each of the materials present in the cavity is such so as to provide efficient stable output. Suitably conversion efficiencies of greater than 40%, more preferably greater than 50% are obtainable at output powers up to 3 W or greater.

In order for the Raman laser to operate with suitable optimal efficiency the key design parameters (ie mirror curvatures, cavity length, positioning of the various components) are suitably chosen so that the resonator mode sizes in the laser material (A), the Raman medium (B) and if present the non-linear medium (frequency-doubling crystal) (C) are near-optimum at a desired operating point. One can denote the beam waists in these media as $\omega_A$, $\omega_B$ and $\omega_C$ respectively. $\omega_A$ is suitably mode-matched to the dimension of the pumped region of the laser material i.e., the pump spot size ($\omega_P$). $\omega_P$ can vary according to the power of the pump laser source (e.g., a diode laser) and the pumping configuration. For example a laser crystal end-pumped with a low power (~1 W) laser diode will typically have a $\omega_P$ of approximately 100 μm. A laser crystal end-pumped with a 15–25 W laser diode will typically have a $\omega_P$ in the range 250 to 350 μm, more usually of approximately 300 μm. A laser crystal side-pumped by one or more laser diodes will typically have a $\omega_P$ in the range of about 500 to 1500 μm. Optimal mode-matching of $\omega_P$ and $\omega_A$ is a suitable prerequisite for enabling efficient extraction of the gain in the laser material. If $\omega_A$ is too small then (i) laser gain typically will not be extracted efficiently into the $TEM_{00}$ resonator mode and (ii) the laser may oscillate on higher-order modes which are generally not desirable. If $\omega_A$ is too large, then diffraction losses can occur in the resonator due to aberrations in the thermal lens associated with the laser crystal. This effect is undesirable and deleterious for pumping powers approximately $\geq$3 W. Typically $$\frac{\omega_A}{\omega_P}$$

is suitably in the range 0.8 to 1.2. $\omega_B$ is suitably optimised for high conversion through the SRS process, while at the same time optical damage to the Raman media is suitably avoided. The optimum value for $\omega_B$ varies from crystal to crystal because (i) different Raman-active crystals have different Raman gains and different thresholds for optical damage. If $\omega_B$ is too large, then the conversion efficiency of the SRS process will be lower than optimum. If $\omega_B$ is too small, then (i) the optical power density in the Raman crystal can approach the threshold for optical damage in that crystal and (ii) the thermal lens associated with the Raman crystal may become more aberrated, resulting in increased renovator losses (due to diff on). Typical values for $\omega_B$ are in the range 200–300 μm. $\omega_C$ is suitably optimised for efficient frequency conversion through the frequency doubling process. The optimum value for $\omega_C$ varies according to the type of crystal used. Different crystals have different non-linear coefficients, walk-off angles and damage thresholds. If $\omega_C$ is too large, then (i) conversion efficiency will be lower than optimum; (ii) the optical field at the Stokes frequency can be "under-coupled"—in this case, unwanted non-linear processes such as higher-order Stokes generation and self-focussing can occur. If $\omega_C$ is too small then (i) optical damage can occur to the crystal, (ii) the effective length of the non-linear interaction can become too short due to "walk-off" effects and (iii) the optical field at the Stokes wavelength can be "over-coupled" which can result in reduced conversion efficiency of the SRS process. This discussion assumes that the mode size in A, B and C is the same for optical fields at different wavelengths. In practice $\omega_A$, $\omega_B$ and $\omega_C$ may be slightly different (by <10%) owing to effects such as guiding and self-focussing.

Suitably the mode size in the laser material is approximately equal to the pump spot size. Suitably in a $LiIO_3$ crystal the spot size $\omega_B$ is optimised for stable operation and efficient conversion such that the spot size in the laser material $\omega_A$ is greater than the spot size in the Raman media $\omega_B$ which in turn is greater than the spot size in the non-linear medium $\omega_C$, if present i.e., $\omega_A > \omega_B > \omega_C$.

In preferred embodiments the thermal lens focal lengths for the laser material at the laser input powers and the thermal lens focal lengths of the Raman medium at the laser output powers are determined and the position of the laser material and the Raman medium in the cavity are selected to ensure that during operation of the laser the resonator is stable. Suitably the thermal lenses for the laser material can be calculated and then confirmed by cavity stability measurement. Alternatively the thermal lenses can be determined by standard measurement techniques such as lateral shearing interferometry measurements which can also provide information on any aberrations. A suitable interferometric technique is described in M. Revermann, H. M. Pask, J. L. Blows, T. Omatsu "Thermal lensing measurements in an interactivity $LiIO_3$ Laser", *ASSL Conference Proceedings* February 2000; in J. L. Blows, J. M. Dewes and T. Omatsu, "Thermal lensing measurement in line-focus end-pumped neodymium yttrium aluminium garnet using holographic lateral shearing interferometry", *J. Applied Physics*, Vol. 83, No. 6, March 1998; and in H. M. Pask, J. L. Blows, J. A. Piper, M. Revermann, T. Omatsu, "Thermal lensing in a barium nitrate Raman laser", *ASSL Conference Proceedings* February 2001. Suitably at least the positional of the laser material and the Raman medium in the cavity are selected such that the combination of the thermal lens powers for the laser and Raman media fall within a stable operating region of a stability plot. A suitable stability plot for a two-mirror resonator can be determined as follows. The ray transfer matrix (M) is calculated for a transit of the optical resonator. The elements of this matrix $$M = \begin{bmatrix} A & B \\ C & D \end{bmatrix}$$

enable an equivalent (two-mirror) resonator to be defined with equivalent g-parameters $g_1^* = A$, $g_2^* = D$ and $L^* = B$. Texts describing this method are N. Hodgson and A. Weber, "Optical Resonators", Springer-Verlag London Limited, 1997 and W. Koechner. "Solid-state Laser Engineering", Springer-Verlag, 1992.

The dynamic nature of the Raman laser resonator as the diode current is increased can be simulated by calculating $g_1^*$ and $g_2^*$ for suitable combinations of the thermal lenses in the laser and Raman crystals. When plotted on a stability plot, a curve can be defined. In a well-designated resonator, this curve will lie in a stable region of the stability plot from the point where laser action is initiated to the point corresponding to the desired operating current.

Figure 6:
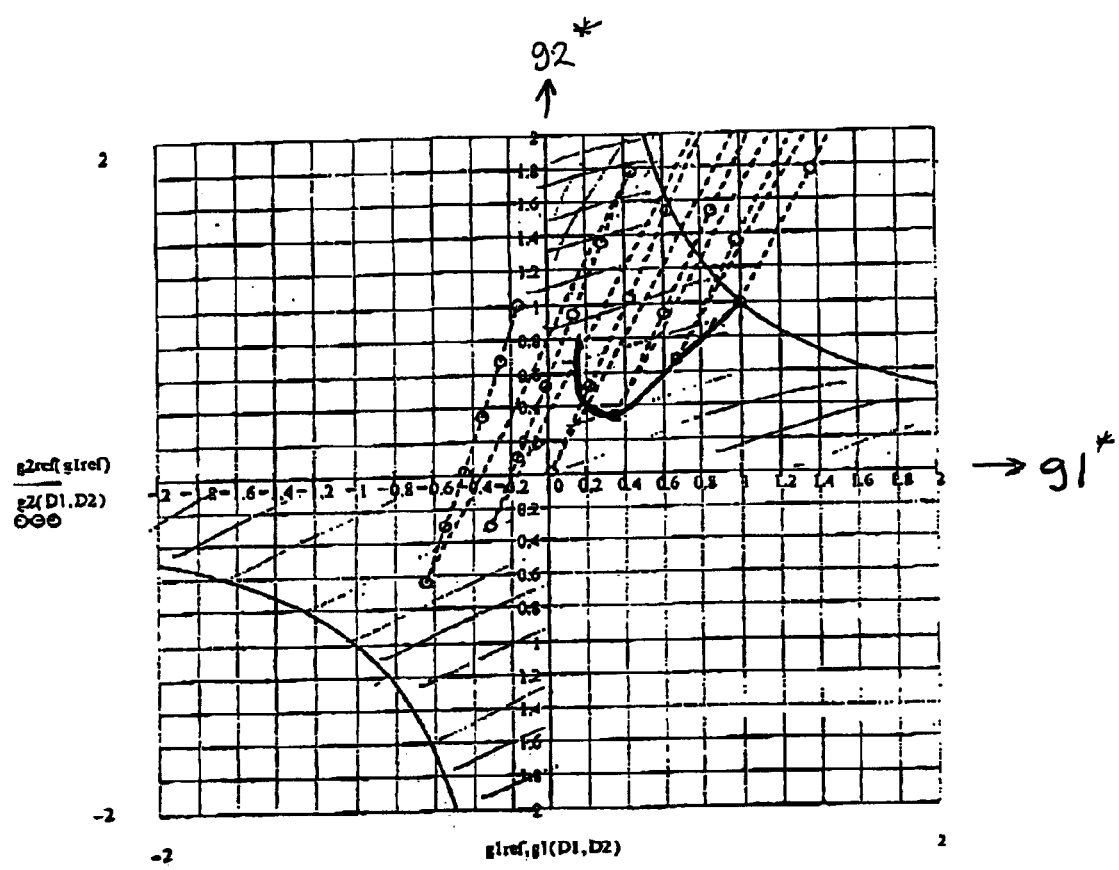
FIG. 6 is a stability diagram for a two-mirror Raman laser.

In example of a stability diagram is shown in FIG. 6. On the stability plot shown the hatched regions corresponds to a stable operating region. Each point on the graph corresponds to a different combination of thermal lens powers for the laser material $D_L$ and Raman media $D_R$. The heavy solid line shows an example how the resonator stability varies in a well-designed Raman laser as the pump diode is increased from zero to the desired operating point. In preferred embodiments a computer model is used to determine suitable cavity configurations for a particular power regime using different combinations of media. In such an embodiment the thermal lensing power for a variety of Raman media crystals can be measured over a wide parameter space of Raman laser output powers and mode sizes and thermally modelled. A standard resonator design program using 2-mirror configurations to more complex folded resonators can then be used to determine the fundamental and Raman laser mode sizes as a function of pump power enabling stable resonators to be designed to produce output powers in specified regions from mWs to multiwatt outputs.

The laser material can be pumped/stimulated by a pulsed or continuous arclamp, flashlamp or diode (semiconductor) laser using a side-pumped, single end-pumped or double end-pumped geometry. End pumping of the laser crystal is a very efficient approach to generating Raman laser output or its second harmonic. For example the inventors have demonstrated optical to optical conversion efficiencies as high as 7% for end pumping with a 20 W output from a fibre-coupled diode laser to produce 1.42 W frequency-doubled Raman laser output at 578 nm. Compared to side-pumped laser crystals, end-pumped laser crystals generally have high gain and give rise to short Q-switched pulses, and the pump spot size in the laser crystal can be adjusted to match the resonator mode size. However end-pumped laser crystals can also give rise to strong (and abberated) thermal lensing, and this ultimately limits the scalability of end-pumped Raman lasers.

Side-pumping of the laser crystal may not result in such high optical-optical conversion efficiency, but it is a cheaper approach, is more easily scalable and enables greater flexibility in where the resonator components can be placed.

Typically the laser beam is Q-switched in order to obtain sufficiently high peak powers for efficient frequency conversion. The resonator cavity may have a folded or linear configuration or other suitable configuration. The position of the laser material and Raman medium in a chosen configuration are suitably chosen to provide cavity stability for a wide range of combinations of $f_L$ and $f_R$.

The laser material suitably generates laser beams at a fundamental wavelength (1064 nm for Nd:YAG) when stimulated by pump light of an appropriate wavelength, and the fundamental laser beam then propagates inside the laser resonator. Suitably the laser material is formed by one of the following crystals: Nd:YAG, Nd:YLF, Nd:glass, Ti-sapphire, Erbium:glass, Ruby, Erbium:YAG, Erbium:YAB, Nd:YAlO$_3$, Yb:YAlO$_3$, Nd:SFAP, Yb:YAG, Yb:YAB, Cobalt:MgF$_2$, Yb:YVO$_4$, Nd:YAB, Nd:YVO$_4$, Nd:NYALO, Yb:YLF, Nd:YCOB, Nd:GdCOB, Yb:YCOB, Yb:YCOB or other suitable laser material. Typically the laser material is broadband AR-coated for the 1–1.2 micron region to minimize resonator losses. Optionally the laser material is wavelength tunable and capable of generating high power output which can be mode-locked.

The Raman medium suitably enables the fundamental radiation to be converted to first (or higher) Stokes wavelength through the nonlinear process Stimulated Raman Scattering (SRS). Depending on application, the Raman medium suitably converts the fundamental wavelength to the first Stokes wavelength, to the second Stokes wavelength or to a higher Stokes wavelength. Typically the Raman medium is broadband AR-coated for the 1–1.2 micron region to minimize resonator losses. The Raman medium is suitably chosen on the basis of high transmission at the fundamental and Stokes wavelengths, useful Raman shift, fairly high Raman gain, high damage threshold and availability in lengths exceeding 1 cm and chosen such that the Raman gain is adequate. Typically the Raman medium is a crystal, typically a single crystal. Typically the length of the crystal is 1–7 cm long. A typical dimension of the crystal is 0.5×0.5xy cm where y is crystal length and is in the range 1–7 cm longer crystal lengths are typically used where higher output powers are desired since the Raman gain coefficient is proportional to the length of the Raman gain medium. Alternatively a longer path through the Raman crystal can be achieved using a multipass of zigzag geometry such as described in Byer patent U.S. Pat. No. 5,673,281. Suitably the Raman medium is a single crystal of $LiIO_3$ or $Ba(NO_3)_2$ or other suitable Raman active material such as KDP (potassium dihydrogen phosphate), KD*P (deuterated), lithium niobate, and various tungstates (KGW, $CaWO_4$) and molybdate crystals. Other suitable Raman active crystals are described in the CRC Handbook of Laser or the text "Quantum Electronics" by Pantell and Puthoff. $LiIO_3$ and $Ba(NO_3)_2$ are preferred. $Ba(NO_3)_2$ is an isotropic crystal with a high gain coefficient (11 cm/GW with 1064 nm pump) leading to low threshold operation and can provide a Raman shift of 1048.6 $cm^{-1}$. $LiIO_3$ is a polar uniaxial crystal with a complex Raman spectrum which depends on the crystal cut and orientation with respect to the pump propagation direction and polarisation vectors and can provide Raman shifts of between 745 $cm^{-1}$ and 848 $cm^{-1}$ (which are useful when targeting wavelengths for specific applications for example 578 nm which is useful for medical applications including ophthalmology and dermatology) but has a lower damage threshold (about 100 $MWcm^{-2}$) compared with $Ba(NO_3)_2$ (about 400 $MWcm^{-2}$). Both $Ba(NO_3)_2$ and $LiIO_3$ have good slope efficiencies (determined by the ratio of Stokes to pump photon energies) with optical to optical conversion efficiencies of 70–80% being reported for both $Ba(NO_3)_2$ and $LiIO_3$.

The following laser material/Raman medium combinations are particularly desirable: $Nd:YAG/LiIO_3$, $Nd:YAG/Ba(NO_3)_2$ and $Nd:YLF/CaWO_4$. In one embodiment the laser may further include a non-linear medium for frequency doubling the Raman laser beam to produce an output at its second organic or other subfrequency or different frequency wavelength, the non-linear medium being present in the resonator cavity or external to resonator cavity.

Optionally a solid non-linear medium is used for frequency doubling the Raman laser beam to produce an output at its second harmonic or other subfrequency or different frequency wavelength. The solid non-linear medium can be located in the cavity (intra cavity doubled—doubling crystal located inside the resonator) or external to the cavity (extra cavity doubled—doubling crystal located outside of the laser resonator). Suitably a folded resonator is used. Suitable solid non-linear mediums include a second harmonic generator (SHG), a sum frequency generator (SFG) or a difference frequency generator (DFG). As examples of n n-linear medium mention can be made of LBO, CTP, BBO, $LiIO_3$, KDP, KD*P, $KB_5$, $KB_5O_8$, KTP, ADP, LN (lithium niobate) or periodically-poled LN or combinations thereof (e.g. to generate green and yellow lasers simultaneously). Suitably a LBO, BBO or KTP crystal is used. The light can be frequency doubled by angle-tuning and/or controlling the temperature of the solid non-linear medium. In preferred embodiments the light is frequency doubled so as to generate yellow light. Typical variations in the visible wavelength with a LBO crystal cut for type 1 non-critical phase-matching with temperature tuning to approximately 149° C., 40° C. or 0° C. include 532 nm (green), 578–580 nm (yellow) and 632–636 nm (red) (with two doubling crystals simultaneous 532 nm and 578 nm output is possible). By such frequency doubling it is possible to generate wavelengths typically in the yellow or orange spectral region suitable for dermatological, ophthalmic and visual display applications. The resonator design is such that the size of the waist in the doubling medium is typically sufficiently small to allow efficient conversion and high output powers but large enough to avoid optical damage. Suitably the solid non-linear medium is AR coated to minimise losses in the 1–1.2 micron region and in the visible where possible. A suitable AR coated LBO crystal for intracavity use is 4×4×10 mm and for extracavity use is 4×4×10 mm although other sizes can be used.

For intracavity doubling, the crystal is suitably placed near a beam waist. For extracavity doubling, the Raman laser output is focussed by lenses into the crystal for maximum conversion.

Preferably the resonator cavity is defined by at least two reflectors which can be two mirrors at least one of which is preferably curved to provide a stable output laser beam (the other mirror may be flat). Other suitable reflectors that can be used in the present invention include prisms or gratings. More preferably at least two curved mirrors are used, although it is possible to use more than two mirrors, different sets of mirrors reflecting the propagating laser beam and the propagating Raman beam such as in a bow-tie resonator. When a solid non-linear medium is used, another mirror may may be present such as in a dichroic cavity. Suitable reflectors defining the resonator cavity are well known in the art and can be coated to enable operation at lower Raman thresholds for the first Stokes order thereby helping to suppress higher-order Stokes generation and self-focussing. The mirrors are also typically coated to have high transmission at the wavelengths of interest. Reflectors can be provided with special dielectric coating for any desired frequency. In this way the resonator cavity can be tuned to the Stokes wavelength, the pump wavelength or both. The mirrors can provide for the laser output to b coupled out of the cavity such as by use of a broadband dichroic mirror transmissive at the frequency of the output beam but suitably highly reflective as other frequencies so as to cause build-up of the power intensities of the beams in the cavity. Alternatively a polarisation beam splitter can be used to outcouple the laser output. The radius of curvature and separation between the reflectors (cavity length) and transmission characteristics of the outcoupling mirror are suitably chosen to provide cavity stability for a sufficiently wide range of combinations of $f_L$ and $f_R$. The radius of curvature of the reflectors are appropriately selected on the basis of the Raman and laser crystal used (for some Raman crystals +ve effective lens powers of the reflector are desirable and for others –ve effective lens powers of the reflectors are desirable). Suitably the mirrors are chosen so as to be greater than 99% reflective at the laser wavelengths. The output mirror is typically chosen (to optimise the first Stokes output) to be 10 to 90% reflective at the Raman wavelength with the other mirror being greater than 99% reflective at the Raman wavelengths. The laser resonator cavity is suitably a stable resonator which supports the $TEM_{00}$ mode. For the intracavity-doubled laser, all mirrors/reflectors are suitably chosen to be >99% reflective at the fundamental wavelength and the Raman wavelength. The frequency-doubled laser beam is suitably coupled out of the resonator through a dichroic mirror—i.e., a mirror which has high transmission at the frequency doubled wavelength but high reflectivity at the fundamental and Raman wavelength. Preferably the resonator has three or more mirrors/reflectors and is configured so that the frequency-doubled beams which are generated in both directions in the non-linear medium can be extracted efficiently in a single beam. In such a configuration, the end mirror closest to the non-linear medium will have high reflectivity at the frequency-doubled wavelength.

Suitably the transmission characteristics, radius of curative and separation of the reflectors are tailored to achieve efficient and stable operation of the Raman laser and when a solid non-linear medium is used, to generate output at the visible wavelengths. Suitably the curvature of the reflectors and cavity length are optimised to obtain the desired mode diameter such that near-optimum beam waists are achieved simultaneously in the laser material, the Raman medium and when present, the solid non-linear medium such that changes in the focal lengths of the laser material and the Raman medium as a result of thermal effects in the laser material and the Raman medium during operation of the laser do not substantially cause instability in the power of the output Raman laser beam. The laser material, Raman medium and when present, the non-linear medium can be positioned in the cavity as discrete elements. Alteratively one or more of the components can be non-discrete, one component performing the dual function of both the laser material and the non-linear medium (such as self-frequency doubling or self doubling materials such as Yb:YAB and Nd:YCOB) or performing the dual function of the laser material and the Raman medium (Nd:KGW) or the dual function of the Raman medium and the non-linear medium (such as by use of a non-centrosymmetric crystal such as LiIO$_3$).

The pulse repetition frequency of the output can be varied by using a Q-switch such as an active Q-switch or a passive Q switch. An acousto-optic Q-switch, an electro-optic Q-switch or passive Q-switches (Cr:YAG) can be used. Alternatively a cavity dumping configuration or other suitable means can be adopted (see "The Laser Guidebook" by Jeff Hecht, $2^{nd}$ Edition, McGraw-Hill 1992, the whole content of which is incorporated by cross reference). The Q-switch causes fundamental laser output to occur in a pulsed format with high peak powers as required to achieve efficient Raman conversion. Typically the Q-switch is broadband AR-coated for the 1–1.2 micron region to minimise resonator losses. The selection and alignment of the Q-switch is tailored to achieve a high-Q resonator for the fundamental. The pulse frequency is suitably chosen to provide cavity stability for a wide range of combinations of $f_L$ and $f_R$. Selection of the pulse repetition frequency affects the conversion efficiency to the Stokes wavelength, and therefore the Stokes output power and therefore also the thermal lens in the Raman medium. It is a useful parameter to vary because (to first-order) it affects the thermal lens in the Raman crystal while having very little effect on the thermal lens in the laser crystal.

Use of Q-switch pulse repetition frequency (prf) varies the laser output power and affects the "transit" through the stability diagram as shown in FIG. 6. The prf is a useful parameter of the laser system The SRS process depends strongly on the peak power at the fundamental wavelength, and as the prf is increased, the peak power generally decreases. Varying the prf has two effects:

(i) because the Raman gain varies in proportion to the peak power at the fundamental wavelength, an increase of the prf will typically result in a decease of the average output power at the Stokes wavelength (or its second harmonic);

(ii) varying the prf has very little effect on the thermal lens power associated with the laser crystal (that power is determined by the power density of the diode laser pump light). However as stated in (i) above, varying the prf does impact on the output power at the Stokes wavelength. Because the thermal lens power in the Raman crystal is proportional to power density at the Stokes frequency, a variation in prf also changes the thermal lens power in the Raman crystal (independently of the thermal lens power in the laser crystal). This can be useful in optimising the region of the stability where the system is desired to operate, and also the "transit" through the stability diagram. At least one polariser can be included in the cavity and can be one or two plates of glass at Brewsters angle and/or a cube polariser. Such polarisers cause the fundamental to laser on only one linear polarisation Some polarisation discrimination can also be introduced through the use of mirrors at non-normal incidence.

With reference to FIG. 1 a Raman laser 1 in accordance with the invention comprises a resonator cavity defined by a reflector M1 and a partial reflector and output coupler M2, a laser material 2A located in the resonator cavity, a solid Raman medium 7 located in the resonator cavity for shifting the frequency of the cavity laser beam to produce a Raman laser beam which propagates within the resonator cavity The partial reflector and output coupler M2 couples and outputs the Raman laser beam from the resonator cavity. A Q-switch 6, dichroic mirrors 3 and 4 and polariser 5 are also provided in the cavity. In use a current is applied to two diode lasers (not shown) which pump both ends of laser crystal 2A in the cavity via dichroic mirrors 3 and 4. The positions of the laser crystal 2A and Raman medium 7 are selected such that the focal lengths of both the laser crystal 2A and the Raman medium 7 as a result of thermal effects in the laser crystal 2A and Raman medium 7 do not substantially cause instability in the power of the output Raman laser beam whereby the resonator operates in a stable mode. The ways of selecting these parameters to achieve this result are described elsewhere in the specification.

Figure 11:
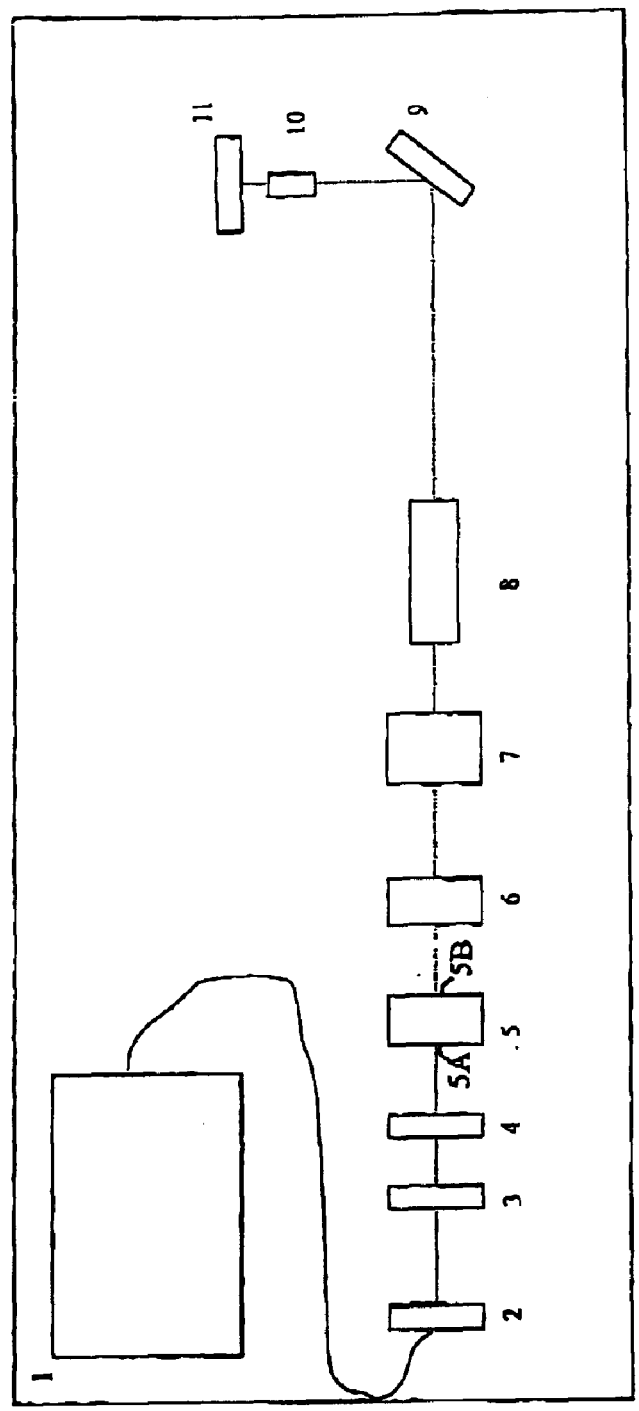
FIG. 11 is a schematic drawing of another suitable Raman laser configuration for use in the present invention in which a frequency-doubled, single-end-pumped Raman laser is used.

With reference to FIG. 11, a laser in accordance with another embodiment of the invention is shown. The laser of this embodiment is a frequency-doubled, single-end-pumped Raman laser. As shown in the drawing the laser comprises a diode laser 1, a fibre end receptacle 2, a collimating lens 3, a focussing lens 4, a laser crystal 5, an optional polarising element 6, an acousto-optic Q switch 7, a Raman-active crystal 8, a turning mirror 9 suitably at 45 degree angle of incidence, a frequency-doubling crystal 10 and a resonator end mirror 11. In use a current is applied to the diode laser 1 which pumps laser crystal 5 in the cavity. The positions of the laser crystal 5 and Raman medium 8 are selected such that the focal lengths of both the laser crystal 5 and the Raman medium 8 do not substantially cause instability in the power of the output Raman laser beam whereby the resonator operates in a stable mode and can be further optimised by ensuring the beam waist in the laser crystal 5, the Raman medium 8 and frequency-doubling crystal 10 are optimised for a desired operating point. The current applied to diode laser 1 can be continuous or pulsed. If a pulsed current is applied then the frequency of the pulse can be altered to change the power of the output Raman laser beam within a range whereby the laser still operates in a stable mode.

The invention will now be described with respect to the following examples.

EXAMPLE 1

Experiments were conducted using a Raman Laser configuration as shown in FIG. 1. The Raman Laser 1 included a diode-pumped Nd:YAG laser employing a commercial pump module (Light Solutions LightLab 1010) 2. The module contained a Nd:YAG rod which was double-end pumped through dichroic turning mirrors 3 and 4. The mirror coatings for M1, M2, 3 and 4 were chosen to provide a high-Q resonator for the fundamental and a lower Q for the first Stokes. Mirror M1 had high reflectivity (>99.9%) at 1064–1160 nm and various output coupling mirrors M2 were used with high reflectivity at 1064 nm and transmissions from 8 to 50% at approximately 1155 nm. The laser was polarised using a one or two Brewster plates 5 and acousto-optically Q-switched 6 at 5–25 KHz to produce pulses at 1064 nm typically of duration of 20–50 ns depending on cavity configuration. A LiIO$_3$ Raman crystal 7 was also located within the cavity to provide a Stokes wavelengths of approximately 1155 nm (1155.2–1155.5 nm as measured using a calibrated Anritsu optical spectrum analyser) corresponding to a frequency shift of about 740–745 cm$^{-1}$—the Stoke wavelength increasing slightly with increasing Stokes output power for a given output coupling and attributed to the effect of thermal loading of LiIO$_3$ which causes thermal expansion of the crystal lattice and a shift in the Raman spectrum. The average Stokes output power at 1155 nm depended on cavity configuration, pulse repetition frequency and diode current. The wavelength of 1155 nm was chosen for the experiments because it can be easily frequency doubled to generate yellow light at 578 nm, a wavelength which coincides with an absorption band of heamoglobin and which is used for various applications in dermatology. The LiIO$_3$ crystal 7 had previously been cut for propagation along the a-axis and oriented so that both the pump and Stokes waves propagated as o-waves in the crystal. The spontaneous Raman spectra or the Raman crystal 7 had an intense peak at about 770 cm$^{-1}$ and a linewidth of 5–6 cm$^{-1}$. In the Raman laser configuration used, the fundamental (1064 nm) and first Stokes (1155 nm) optical fields shared the same resonator. The cavity design used may alter in certain circumstances, for example the position of some elements such as the Nd:YAG rod and the Q-switch are interchangeable. A variety of configurations is within the scope of the present invention.

Experiment 1

A 34 cm long cavity with a 30 cm radius of curvature high reflector, M1, a flat output coupler, M2, with near-optimum transmission at the fundamental of 12% and an aperture (750 µm diameter) to confine oscillation to the TEM$_{00}$ mode was used (for diode currents up to 18 A the fundamental beam profile is generally singly moded and fairly free of aberration, as the diode current is increased however the fundamental profile generally becomes strongly aberrated and may consist of several transverse modes however the Stokes output almost always occurs in a single traverse mode (TEM$_{00}$) indicating Raman beam-cleanup). The output power at 1064 nm was in the range 5.5–6.6 W at the maximum diode operating current (25 A) depending on the exact Q-switch repetition frequency. The optimally-coupled conditions at 1064 nm in this experiment provide the optimum performance baseline to which the output from the Raman laser is compared in order to evaluate optical to optical conversion efficiency. It is not possible to compare the results in terms of the pump power from the diodes because they are inaccessible within the sealed pump module. The positive thermal lens in the Nd:YAG crystal varied with pump diode current and was estimated to have a focal length of near 8 cm (at maximum current). The focal length of the LiIO$_3$ crystal was negative and was estimated to be as short as −10 cm (at maximum first Stoke output power).

In the following experiments, the performance of a LiIO$_3$ Raman laser was investigated as a function of diode current, Q-switch pulse repetition frequency, output coupler transmission at the Stokes wavelength and the length of the Raman crystal. It is important to note that the Experiments the turning mirrors inside the sealed pump module had some transmission at the first Stokes wavelength. Using a probe beam at 1155 nm from another laser source, it was determined that there was an 18% round trip loss at 1155 nm. Given that output coupler transmissions between 8% and 50% were used, the collection efficiencies are broadly consistent with the experimentally-observed decrease of output power when the LiIO$_3$ crystal was placed on the other side of the pump module. All powers reported in the following experiments are those measured directly after the outcoupling mirror and not corrected for the collection efficiency.

Experiment 2

Figure 2:
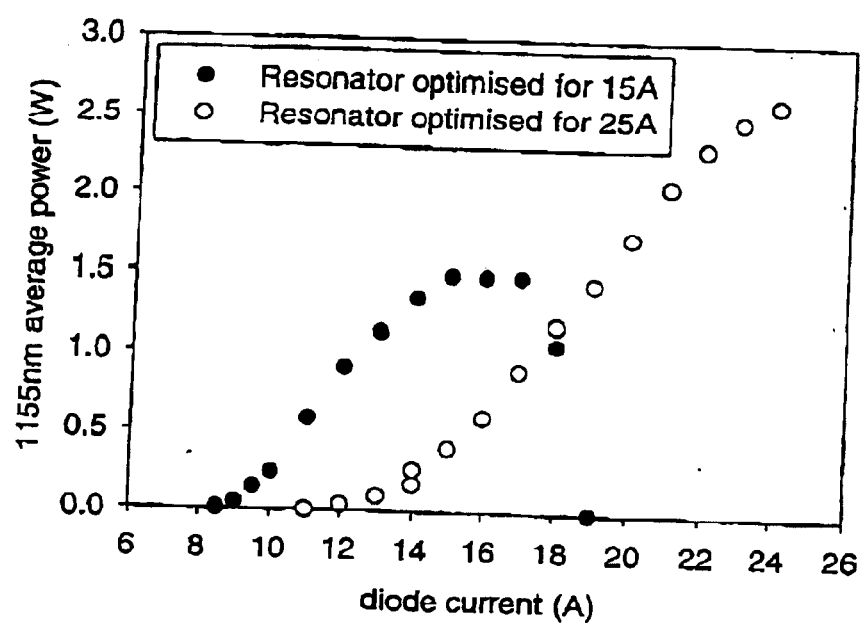
FIG. 2 is a graph of average output power of a Raman laser configuration optimised for operation at 15A and 25A.

The Raman resonator cavities were optimised for the highest Stokes output at a specific diode current. The optimisation was basically empirical, a variety of resonators were evaluated using a variety of combinations of cavity lengths, mirror curvatures, output couplings and positioning of the key cavity elements. FIG. 2 shows the measured output power of the Raman laser at approximately 1155 nm using two separate cavity configurations optimised for operation at 15 A and 25 A diode current. In both cases a 5 cm length of LiIO$_3$ was used.

The first resonator configuration optimised at 15 A incorporated two flat end mirrors, the high reflectivity minor was placed 9.5 cm and the output coupler (50% transmitting) placed 12 cm from the centre of the pump module. A maximum power of 1.45 W at 1155 nm was obtained at 10 kHz corresponding to a conversion efficiency of 57% (78% accounting for collection efficiency) with respect to the base laser performance at 1064 nm (2.6 W). As the diode current was increased above 16 A, the Stokes output became very unstable and quickly decreased to zero. Lasing also ceased at the fundamental (beyond 16 A) indicating that the resonator had become unstable.

For a diode current of 15 A the thermal lens in the Nd:YAG is estimated to be about 23 cm. In the absence of stimulated Raman scattering and for the cavity length of about 23 cm one expects the cavity to be stable. ABCD resonator analysis of the laser incorporating a variable negative lens at the location of the Raman crystal shows that the stability limit for the resonator occurs when the lens in the Raman crystal becomes as short as −20 cm. The size of the mode in the Raman crystal is about 280 µm and the Raman power is 1.5 W at 1155 nm. Preliminary measurements of thermal lensing in a LiIO$_3$ Raman laser indicate a thermal lens of approximately this size.

A second resonator configuration was optimised for operation with a diode current of 25 A. The configuration consisted of a 30 cm concave mirror placed 25 cm from the centre of the pump module and a 10 cm concave output couple with 50% transmission placed 10 cm from the pump module. The pulse repetition frequency was 15 kHz. An average power at 1155 nm of 2.62 W was obtained corresponding to a conversion efficiency of 42% (56% accounting for collection efficiency) with respect to the base laser performance at 1064 nm. A maximum output power of 3.0 W using this resonator was achieved by reducing the pulse repetition frequency to 10 kHz corresponding to a conversion efficiency of 54% (72% accounting for collection efficiency). Under these conditions however frequent damage to the volume of the LiIO$_3$ crystal occurred demonstrating that optimum spot-size (approximately 200 µm in this case) and power density in the LiIO$_3$ crystal is a compromise between maximising conversion efficiency and avoiding optical damage. An ABCD analysis of this cavity shows it to be less sensitive to thermal lensing (than the resonator configuration optimised for a diode current of 15 A) the Raman laser remaining stable for negative thermal lens focal lengths longer than 4 cm.

Figure 7:
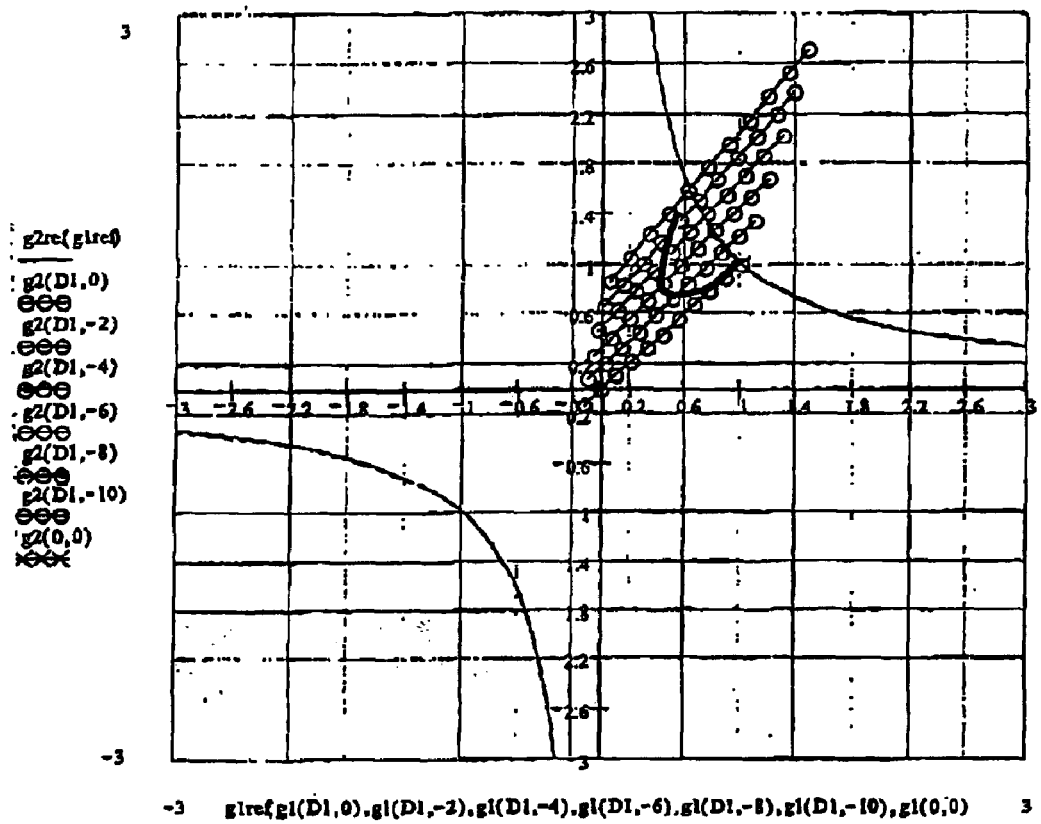
FIG. 7 is a stability diagram for the Raman laser configuration used in FIG. 2 operating at a diode current of 15A.
Figure 8:
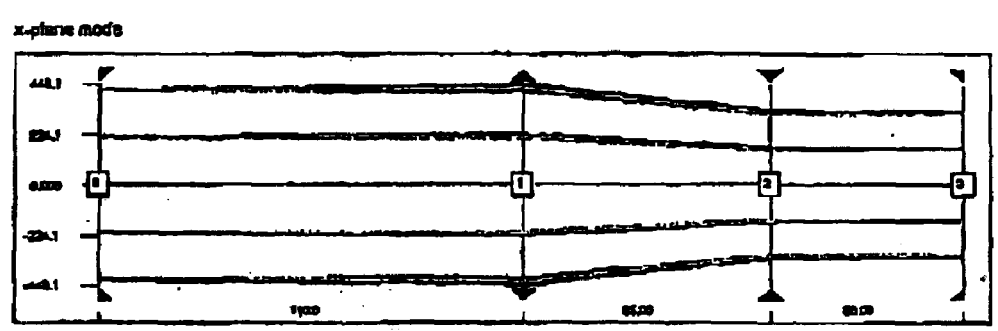
FIG. 8 is the predicted resonator mode of the Raman laser configuration used in FIG. 2 optimised at 15A.
Figure 9:
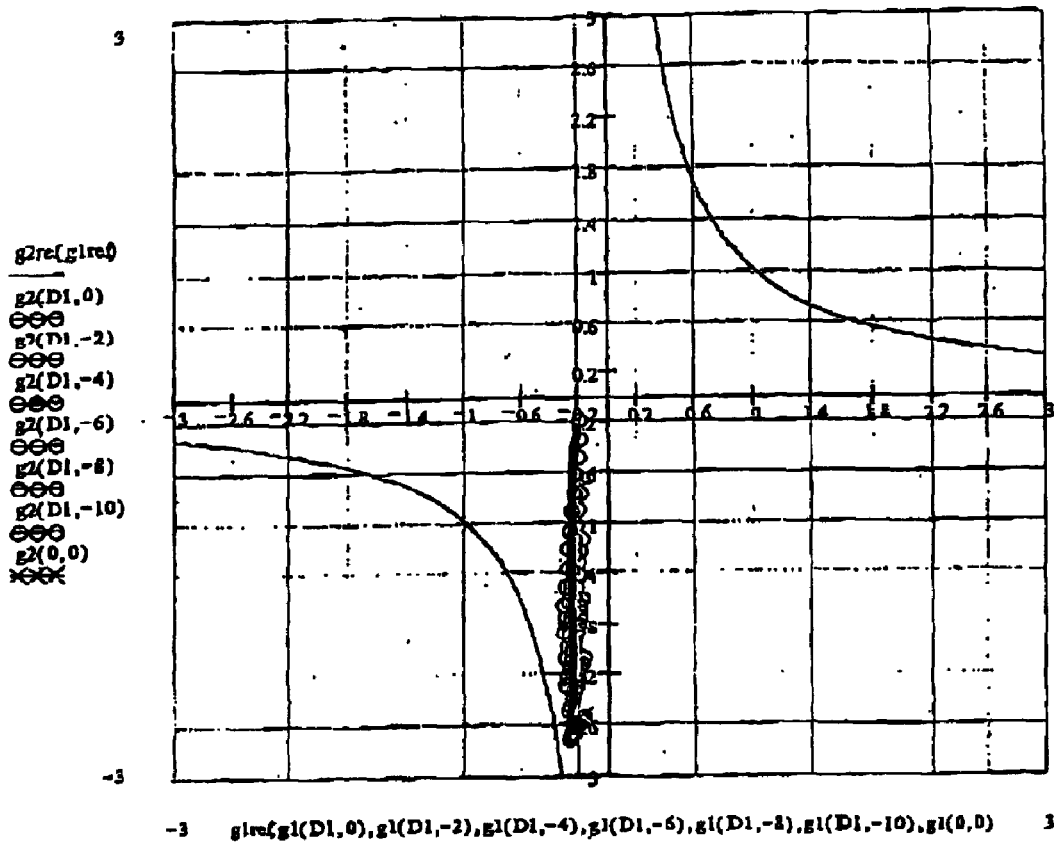
FIG. 9 is a stability diagram for the Raman laser configuration used in FIG. 2 operating at a diode current of 25A.
Figure 10:
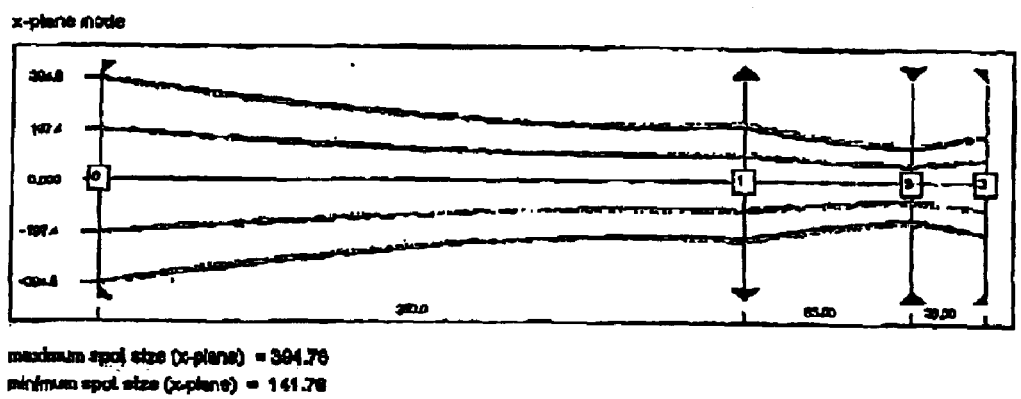
FIG. 10 is the predicted resonator mode of the Raman laser configuration used in FIG. 2 optimised at 25A.

FIGS. 7 and 9 show stability diagrams for each laser, FIG. 7 shows the Raman laser operating at approximately 1155 nm and where the diode current was increased to 15 A (the cavity including two flat mirrors). FIG. 9 shows the Raman laser operating at approximately 1155 nm and where the diode current was increased to 25 A (the cavity configuration including a 30 cm radius of curvature mirror and a 10 cm radius of curvature mirror). FIG. 8 shows the predicted resonator mode at the optimum operating point of the laser operating at approximately 1155 nm with a diode current of 15 A. FIG. 10 shows the predicted resonator mode at the optimum operating point of the laser operating at approximately 1155 nm with a diode current of 25 A.

Experiment 3

A number of Raman Laser parameters were studied. A resonator was used consisting of a 30 cm concave highly reflecting mirror placed about 25 cm from the centre of the pump module and a flat output coupler placed 8 cm from the pump module. The LiIO$_3$ was placed close to the pump module where the resonator mode was largest (approximately 320 µm). A maximum output of 2.3 W at a first Stokes wavelength was obtained with this cavity configuration slightly lower than for the 25 A resonator of Experiment 2 but with a far lower incidence of crystal damage.

Figure 3:
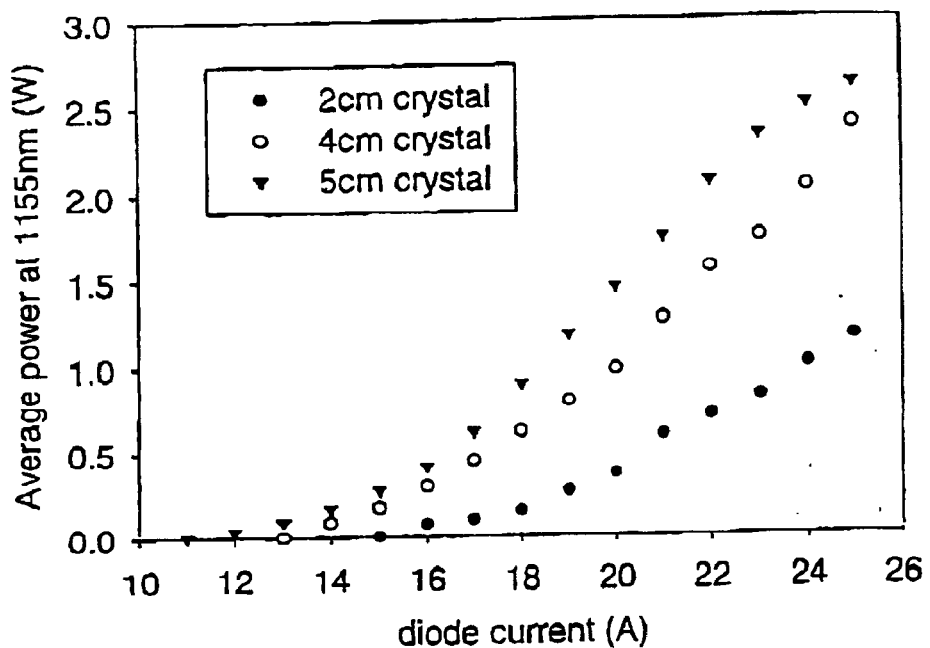
FIG. 3 is a graph of average output power of a Raman laser configuration at various currents using three different crystal lengths.
Figure 4:
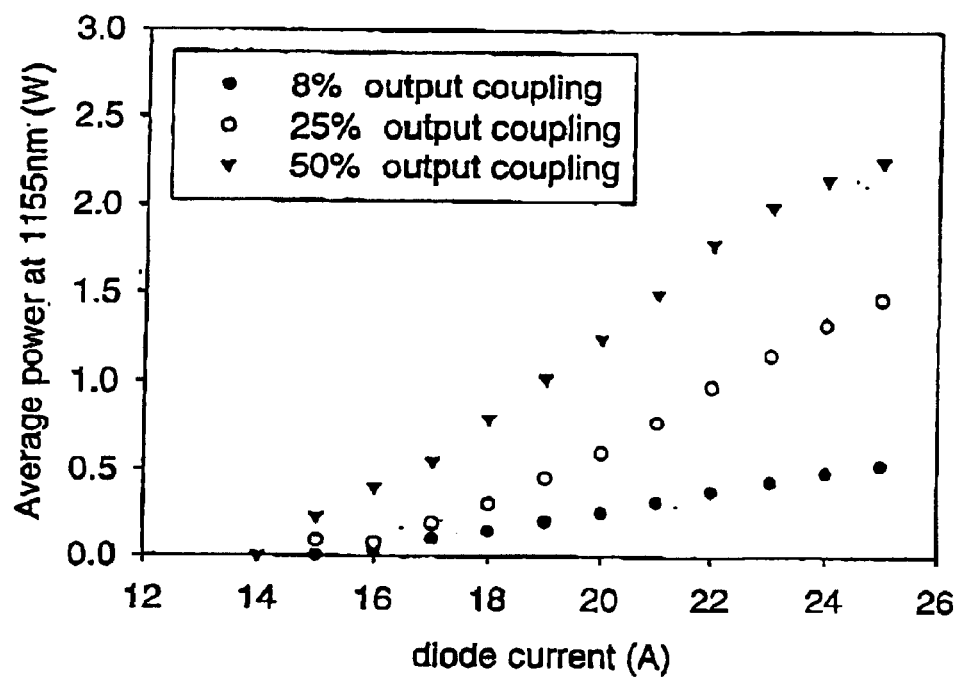
FIG. 4 is a graph of average output power of a Raman laser configuration at various currents using three different output coupling transmissions.

In FIG. 3 the average power of the first Stokes wavelength as a function of diode current for crystal lengths 2, 4 and 5 cm was studied. The pulse repetition frequency was 15 kHz and a 50% transmitting output coupler was used. Higher output powers were achieved with longer crystals as expected since Raman gain coefficient is proportional to the length of the Raman gain medium. The output at 1155 nm obtained using the 4 cm long crystal was twice that obtained using the 2 cm long crystal. Slightly higher powers were obtained using the 5 cm long crystal. The effect of output coupling on the Raman laser performance can be seen in FIG. 4 where output couplings of 8%, 25% and 50% were investigated. The pulse repetition frequency was 15 kHz and the LiIO$_3$ crystal was 5 cm long. Higher output powers are achieved for larger output couplings. Because of the intra-cavity losses (due to the turning mirrors) at 1155 nm, the collection efficiency for the Stokes photons varies with output coupling and is only 31% when using the 8% transmitting output coupler, 58% with the 25% transmitting output coupler and 74% with the 50% transmitting output coupler. The total Stokes output from the resonators using 8%, 25% and 50% transmitting output couplers is respectively 1.7 W, 2.5 W and 3.0 W. The data suggests that higher Raman output powers would be possible by choosing an output coupler with transmission greater than 50%.

Figure 5:
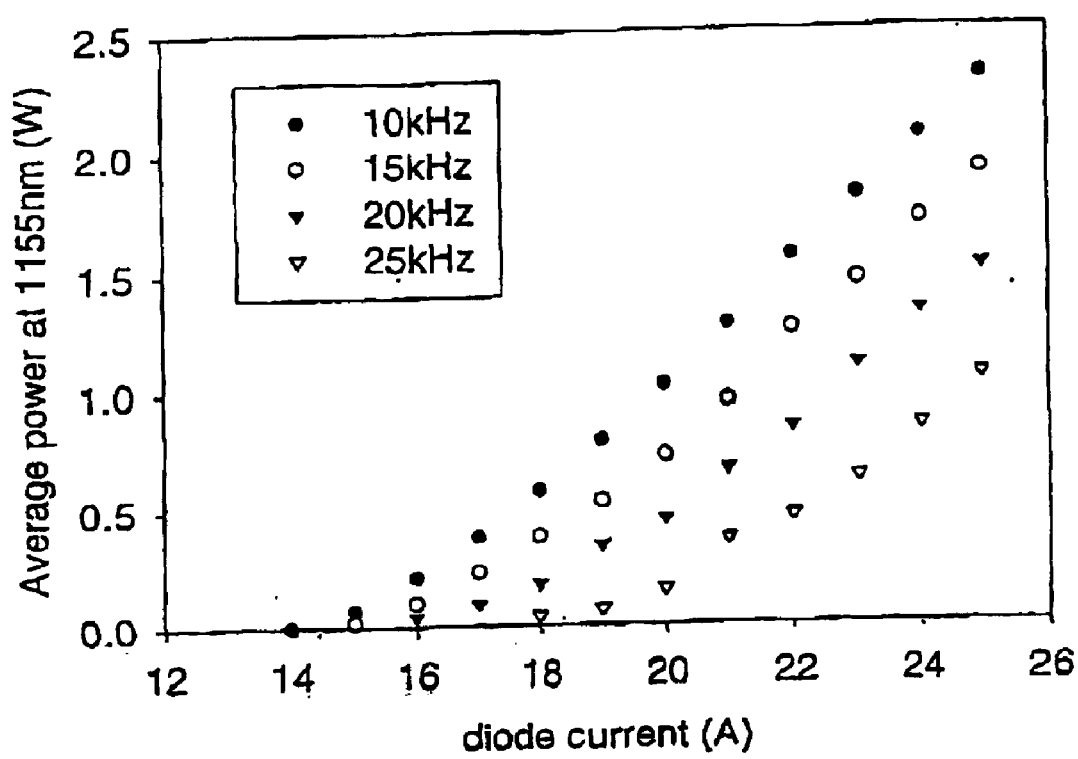
FIG. 5 is a graph of average output power of a Raman laser configuration at various currents using various pulse repetition frequencies.

The effect of pulse repetition frequency is shown in FIG. 5 where the dependence of first Stokes average power is plotted as a function of diode current for pulse repetition frequencies of 10, 15, 20 and 25 kHz. The LiIO$_3$ crystal was 5 cm long and output coupling was 50%. For a given diode current, higher average powers are obtained for lower repetition rates as is consistent with the dependence of Raman gain on peak pump power.

The experiments show that by optimising cavity design, efficient conversion up to 54% (72% accounting for the collection efficiency) is achieved with multiwatt average powers of up to 2.7 W at the first Stokes wavelength (1155 nm) with a low incidence of optical damage. The electrical to optical conversion efficiency with respect to the power consumed by the diodes is estimated to be about 3.3%.

EXAMPLE 2

With reference to FIG. 11, the output of the pump laser diode 1 which is a 25 W fibre-coupled diode laser is launched via fibre end receptacle 2 for 600 µm diameter, 0.22NA fibre, two lenses 3 and 4 into the laser crystal 5 which is a Nd:YAG (5 mm×5 mm diameter laser crystal with mirror coatings on end 1 (5A):HR at 1064–1160 nm, HT at 805 nm and end 2 5B: AR@1064–1160 nm). The pump spot size (beam radius) in the laser crystal is approximately 300 microns. The laser resonator is defined by the first coated plane face of the Nd:YAG laser crystal 5, the plane dichroic mirror 9 at 45 degrees (HR at 1064–1160 nm, HT@578 nm and the end mirror 11 (HR at 578, 1064 and approx 1155 nm) which has a radius of curvature of 300 nm. An LBO 4×4×15 mm crystal is used as the frequency doubling crystal and a LiO$_3$ crystal is used as the Raman-active crystal. The optimum lengths of the two arms of the resonator are 150 mm (YAG crystal to 45 degree mirror) and 90 mm (45 degree mirror to end mirror). This folded cavity design is effective in enabling most of the yellow light generated in the LBO crystal to be collected in a single beam. The maximum laser output power at 578 nm using this configuration was 1.42 W.

Figure 12:
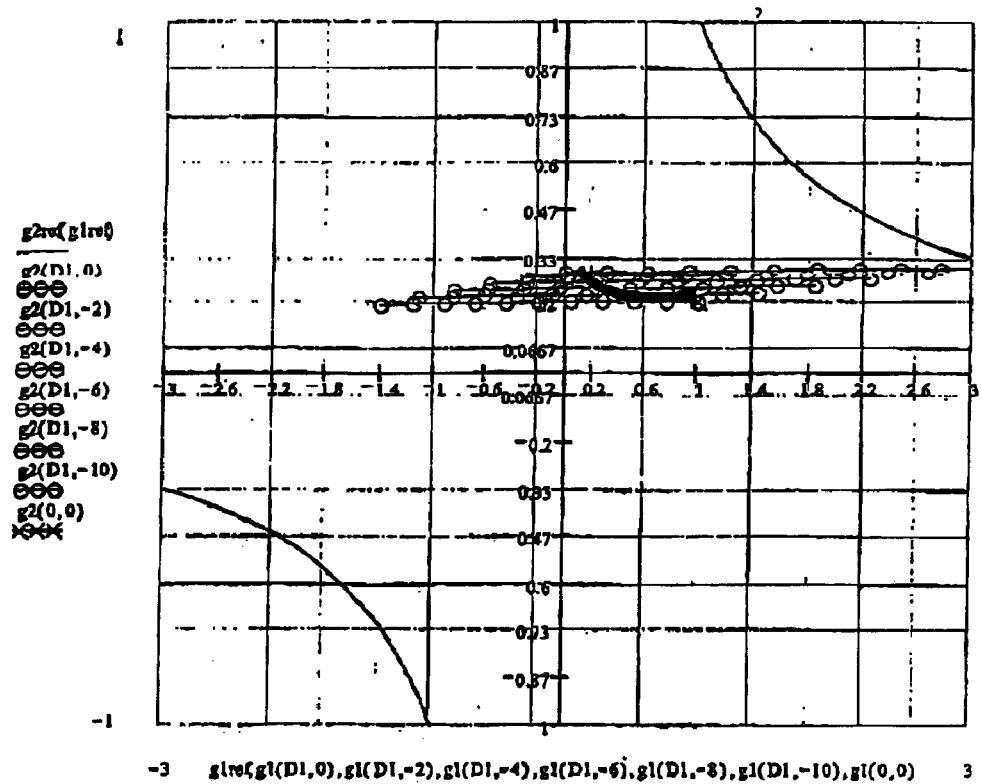
FIG. 12 is a stability diagram showing how the resonator stability varies with various combinations of thermal lens powers of an Nd:YAG and Raman crystal using the laser of FIG. 11.

FIG. 12 is another diagram showing how the resonator stability varies with the possible combinations of thermal lens power in the Nd:YAG and Raman crystals. The heavy line shows how the resonator stability changes as the pump diode current is increased from zero to the desired operating point.

Figure 13:
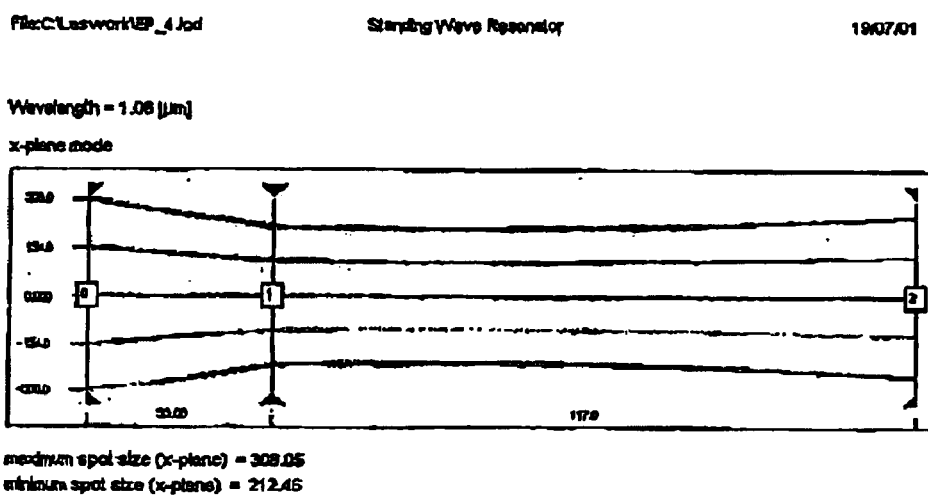
FIG. 13 is a diagram of an ABCD resonator analysis which predicts the relative beam waist at all points of the resonator of FIG. 11 for operation at the desired operating point.

FIG. 13 shows ABCD resonator analysis which predicts the relative beam waist at all positions in the resonator, for operation at the desired operating p int. The number denote the following 0—laser crystal, 2—Raman crystal, 3—end mirror.

Figure 14:
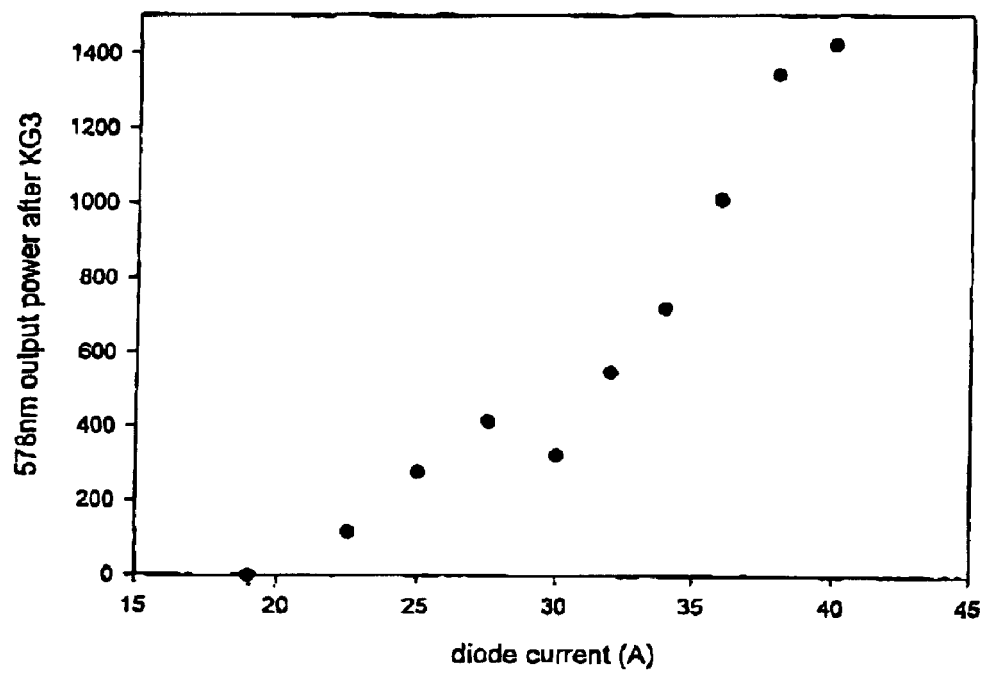
FIG. 14 is a diagram showing the average output power at 578 nm as a function of diode laser current using the laser of FIG. 11.

FIG. 14 shows the average output power at 578 nm as a function of diode laser current.

EXAMPLE 3

A small-scale Raman laser operating at 1197 nm was used. In the system used, the pump laser diode had relatively low output power. 1.6 W of 808 nm diode pump light was focused into a 2×2×1 mm Nd:YVO$_4$ crystal. An acousto-optic Q-switch was used to produce the necessary high peak powers for the SRS process. The Raman-active crystal was Ba(NO$_3$)$_2$ which provided one of the highest Raman gains, having a Raman shift of 1047 cm$^{-1}$. The optimum arrangement for the intra-cavity SRS conversion included using a 10 cm long cavity, with 10% output coupling at 1197 nm and a pulse repetition frequency of 32 kHz. The First Stokes output occurred at 1197 nm and up to 120 mW of output power was obtained.

A frequency-doubled small-scale Raman laser operating at 1197 nm was used. Preliminary measurements were made of intracavity-doubled First Stokes output using a 10 mm long piece of LBO cut for type one phase making. Up to 6 mW at 598 nm was achieved under non-optimised conditions. The cavity was not optimised for collection of the output at 598 nm, the output was only able to be measured from one end of the cavity.

By use of the apparatus and method of the invention it is possible to optimise the cavity including determining where to position components in the cavity so as to get high power output and power stability over a reasonable working range from initial power input up to maximum power and can be scaled up or down for various power regimes.

The invention particularly when frequency-doubling medium is used has application in hospitals, specialist clinics and in general practitioner/single specialist surgeries where solid state Raman lasers could be used for ophthalmology and/or dermatology.

Specifically the 578 nm output for a frequency-doubled Nd:YAG/LiIO3 Raman laser closely matches a strong optical absorption peak of haemoglobin (human blood); this source may be applied in various forms of retinal surgery, treatment of varicose veins and removal of port-wine stains (birth marks), spider veins (telangectasia) and other dermatological therapies. Frequency-doubled solid-state Raman lasers may be used for a variety of spectroscopic sensing applications including biomedical diagnostics, atmospheric and underwater sensors. A further example is the use of such sources as laser guidestars associated with astronomical observations or other forms of optical characterisation of the atmosphere. Such sources may also be used for various forms of illumination in the orange yellow spectral region including illumination of holographic plates, as an element in colour projection systems and as laser pointers (such illumination applications stem from the lack of alternative solid-state lasers operating in the yellow spectral region where the human eye is most sensitive.

It will be appreciated by those skilled in the art that the invention can be embodied in other forms.

What is claimed is:

1. A diode pumped, solid-state Raman laser comprising:
   (i) a resonator cavity having at least one reflector and an output coupler for decoupling and outputting an output beam from the resonator cavity;
   (ii) a laser material positioned in the resonator cavity configured to be pumped by a pump beam from a diode pump source, the pump beam having a beam size ($\omega_P$) in the laser material, in response to being pumped by the pump beam the laser material emitting a cavity laser beam propagating in the resonator cavity with a cavity laser beam mode size ($\omega_A$) in the laser material, the laser material having a thermal lens resulting from being pumped by the pump beam, the thermal lens of the laser material having a focal length that changes with increasing deposition of heat in the laser material;
   (iii) a Q-switch that converts the cavity laser beam into a pulsed cavity laser beam;
   (iv) a solid-state Raman medium positioned in the resonator cavity that shifts an optical frequency of the pulsed cavity laser beam to produce a Raman laser beam that propagates in the resonator cavity, the Raman laser beam having a Raman laser beam mode size ($\omega_B$) in the Raman medium, the Raman medium having a thermal lens with a focal length that changes with increasing deposition of heat in the Raman medium, wherein ($\omega_A$) is greater than ($\omega_B$) and ($\omega_A$) is mode-matched to ($\omega_P$).

2. The diode pumped, solid state Raman laser according to claim 1 further including a non-linear medium for frequency doubling the Raman laser beam, the non-linear medium being located internal to the resonator cavity, wherein the Raman laser beam has a Raman laser beam mode size ($\omega_C$) in the non-linear medium, and wherein the cavity laser beam mode size ($\omega_A$) in the laser material is greater than the Raman laser beam mode size ($\omega_C$) in the non-linear medium.

3. The diode pumped, solid state Raman laser according to claim 1 wherein the pulsed cavity laser beam has a pulse repetition frequency selected to provide that ($\omega_A$) is greater than ($\omega_B$).

4. The diode pumped, solid state Raman laser according to claim 1 wherein the laser material is selected from the group consisting .Nd:YAG, Nd:YVO$_4$, and Nd:YLF; and the Raman medium is selected from the group consisting of LiIO$_3$, CaWO$_4$, KGW and Ba(NO$_3$)$_2$.

5. The diode pumped, solid state Raman laser according to claim 2 wherein the non-linear medium is selected from the group consisting of LBO, BBO and KTP.

6. The diode pumped, solid state Raman laser according to claim 4, wherein the laser material is Nd:YAG and the Raman medium is selected from LiIO$_3$, CaWO$_4$, KGW and Ba(NO$_3$)$_2$.

7. The diode pumped, solid state Raman laser according to claim 1 further comprising a diode pump laser source for pumping the laser material.

8. The diode pumped, solid-state Raman laser according to claim 7 further comprising means to vary the frequency of the pump laser beam so as to vary the output power of the output beam.

9. A method of generating a Raman laser beam using a diode-pumped, solid state Raman laser comprising:
   providing a diode pumped solid-state Raman laser that includes a stable resonator cavity that has at least one reflector and an output coupler;
   a laser material and a Raman material positioned in the resonator cavity, and a Q-switch;
   pumping the laser material with a pump beam produced from a diode pump source, the pump beam having a pump laser beam size ($\omega_P$) in the laser material,
   producing a cavity laser beam in the stable resonator cavity with a cavity laser beam mode size ($\omega_A$) in the laser material, wherein ($\omega_A$) is mode-matched to ($\omega_P$);
   forming a thermal lens in the laser material with a focal length that changes with an increasing deposition of heat in the laser material;
   converting the cavity laser beam into a pulsed cavity laser;
   shifting an optical frequency of the pulsed cavity laser beam to produce a Raman laser beam which propagates in the resonator cavity, the Raman laser beam having a Raman laser beam mode size ($\omega_B$) in the Raman medium, wherein ($\omega_A$) is greater than ($\omega_B$);
   forming a thermal lens in the Raman medium with a focal length that changes with an increasing deposition of heat in the Raman medium: and
   decoupling and outputting an output beam from the resonator cavity.

10. The method according to claim 9 including a further step of providing a non-linear medium for frequency doubling the Roman laser beam, the nonlinear medium being located internal to the resonator cavity, wherein the Roman laser beam has a Raman laser beam mode size ($\omega_C$) in the non-linear medium, and wherein the cavity laser beam mode size ($\omega_A$) in the laser material is greater than the Raman laser beam mode size ($\omega_C$) in the non-linear medium.

11. The method according to claim 10 wherein the frequency doubling produces an output at a wavelength selected from the group 578–580 nm, 632–636 nm, about 598 nm and combinations thereof.

12. The laser according to claim 5 wherein the laser material is selected from the group consisting of Nd:YAG, Nd:YVO$_4$ and Nd:YLF; and the Raman medium is selected from the group consisting of LiIO$_3$, CaWO$_4$, KGW and Ba(NO$_3$)$_2$.

13. The diode-pumped, solid-state Raman laser of claim 1, wherein a ratio of the cavity laser beam mode size ($\omega_A$) in the laser material to the pump laser beam spot size ($\omega_P$) ranges between 0.8 and 1.2.

14. The method of claim 9, wherein a ratio of the cavity laser beam mode size ($\omega_A$) in the laser material to the pump laser beam spot size ($\omega_P$) ranges between 0.8 and 1.2.

15. The diode-pumped, solid-state Raman laser of claim 1, further comprising: a non-linear medium for frequency doubling the Raman laser beam, wherein the Raman laser beam has a Raman laser beam mode size ($\omega_C$) in the non-linear medium, and ($\omega_A$) is greater than ($\omega_B$) and ($\omega_B$) is greater than ($\omega_C$).

16. The diode-pumped, solid-state Raman laser of claim 1, wherein the laser crystal is side-pumped and the dimension of the pumped region of the laser material is ($\omega_P$).

17. The diode pumped, solid state Raman laser of claim 16, further including a non-linear medium for frequency doubling the Raman laser beam, the non-linear medium being located internal to the resonator cavity, wherein the Raman laser beam has a Raman laser beam mode size ($\omega_C$) in the non-linear medium, and wherein the cavity laser beam mode size ($\omega_A$) in the laser material is greater than the Raman laser beam mode size ($\omega_C$) in the non-linear medium.

* * * * *